(12) United States Patent
Schliephake et al.

(10) Patent No.: US 6,333,011 B1
(45) Date of Patent: Dec. 25, 2001

(54) APPARATUS FOR MEASURING TEMPERATURES IN TUBULAR REACTORS

(75) Inventors: Volker Schliephake, Schifferstadt; Ulrich Hammon, Mannheim; Ulrich Rauh, Limburgerhof; Armin Schraut, Bensheim, all of (DE)

(73) Assignee: BASF Aktiengesellschaft, Ludwigshafen (DE)

(*) Notice: Subject to any disclaimer, the term of this patent is extended or adjusted under 35 U.S.C. 154(b) by 0 days.

(21) Appl. No.: 09/064,310

(22) Filed: Apr. 23, 1998

(30) Foreign Application Priority Data

Apr. 23, 1997 (DE) ............................................. 197 17 165

(51) Int. Cl.$^7$ ....................................................... B01J 8/06
(52) U.S. Cl. ........................ 422/197; 422/105; 422/109; 422/188; 422/211; 422/312
(58) Field of Search .................................. 422/109, 105, 422/197, 312, 188, 201, 211, 196

(56) References Cited

U.S. PATENT DOCUMENTS

| | | | |
|---|---|---|---|
| 3,147,084 | 9/1964 | Franzen et al. | 422/197 |
| 3,285,713 | 11/1966 | Pochler et al. | 422/197 |
| 3,645,701 | * 2/1972 | Banchik et al. | 422/197 |
| 3,656,914 | * 4/1972 | Friedrichsen et al. | 422/312 |
| 3,736,355 | 5/1973 | Croci et al. | 562/546 |
| 4,224,187 | 9/1980 | Vanderspurt | 502/212 |
| 4,267,386 | 5/1981 | Vanderspurt | 568/480 |
| 4,342,699 | 8/1982 | Palmer et al. | 549/259 |
| 4,929,798 | 5/1990 | de Lasa | 585/109 |
| 5,739,391 | 4/1998 | Ruppel et al. | 562/532 |

FOREIGN PATENT DOCUMENTS

| | | |
|---|---|---|
| 1 185 590 | 9/1965 | (DE) . |
| 1 962 431 | 6/1970 | (DE) . |
| 23 38 111 | 2/1975 | (DE) . |
| 29 43 707 | 5/1980 | (DE) . |
| 29 03 582 | 11/1980 | (DE) . |
| 44 31 949 | 3/1995 | (DE) . |
| 1 467 865 | 3/1977 | (GB) . |

* cited by examiner

*Primary Examiner*—Hien Tran
(74) *Attorney, Agent, or Firm*—Oblon, Spivak, McClelland, Maier & Neustadt, P.C.

(57) ABSTRACT

A reactor apparatus comprises at least two same-type tubular reactors which are filled with solid particles, at least one tubular reactor containing a temperature measuring unit, the tubular reactors being designed such that both the ratio of the mass of the solid particles to the free cross-sectional area of the respective tubular reactor and the pressure drop measured by an inert gas being conducted transversely to the free cross-sectional area are identical across the respective tubular reactor. The apparatus is suitable for treating fluid masses while generating or consuming thermal energy, the temperature being measured.

13 Claims, 4 Drawing Sheets

C-D

APPARATUS FOR MEASURING TEMPERATURES IN TUBULAR REACTORS

BACKGROUND OF THE INVENTION

1. Field of the Invention

The present invention relates to an apparatus and a method for representative temperature measurements in same-type tubular reactors filled with solid particles, at least one tubular reactor containing a temperature measuring unit.

2. Description of the Related Art

Exothermal reactions such as oxidation reactions on an industrial scale are often, on the grounds of heat transfer and the narrow residence time distribution, carried out in tubular reactors (compare eg. U.S. Pat. No. 3,147,084, German Patent No. 11 85 590 and German Patent No. 29 03 582), the reaction volume usually being located within the tubes and the space between the tubes having a fluid heat transfer medium flowing through it for heating or cooling purposes. In general the reaction is carried out as a gas phase reaction with the aid of a heterogenous catalyst. The catalysts used are generally unsupported catalysts or support materials of identical geometrical shape and coated with active material. Such reactors are employed in the chemical industry, for example, in the production of phthalic anhydride from o-xylene or the production of acrolein or acrylic acid from propene or propane (compare eg. DE-A-1 962 431 and DE-A- 2 943 707).

Any assessment of the state of the reactor, of the product quality to be expected and of the conversion ratio relies strongly on the temperature along the flow path of the reacting component in the reactor. This temperature profile is usually obtained by means of a thermocouple or a resistance thermometer. For industrial use, the thermocouple or resistance thermometer is mechanically protected against damage. To this end it is usually fitted within a thermometer protection sleeve. Such a thermometer sleeve does have the drawback, however, that it occupies a certain volume and consequently, in general, will alter the flow profile and thus the pressure drop behavior of the tube including its charge. Since, on the other hand, it is important that the temperature measurements be carried out on one or more tubular reactors which are representative of all tubular reactors, the reaction process in the tubular reactor in which the temperature is measured is required to be identical with the process in the tubular reactors without a temperature measuring unit.

BRIEF SUMMARY OF THE INVENTION

It is therefore an object of the present invention to provide an apparatus and a method which allows temperatures to be measured under representative conditions in a tubular reactor.

It was found, surprisingly, that this object can be achieved if tubular reactors with and without a temperature measuring unit are set up such that the mass of the introduced solid particles is directly proportional to the free cross-sectional area of the tubular reactor in question, and the flow resistance or pressure drop and thus the mean linear velocity in the tubular reactors is identical if a gas flow rate proportional to the free cross-sectional area is passed across the tube. If these two conditions are complied with, the conditions established in the tubular reactors with and without a temperature measuring unit are comparable in reaction kinetics and thermal terms. Free cross-sectional area indicates a cross-sectional area determined in the absence of the solid particles.

The invention therefore relates to an apparatus comprising at least two same-type tubular reactors which are filled with solid particles, at least one tubular reactor containing a temperature measuring unit, wherein tubular reactors are designed such that both the ratio of the mass of the solid particles to the free cross-sectional area of the respective tubular reactor and the pressure drop measured by an inert gas being conducted proportionately transversely to the free cross-sectional area are identical across the respective tubular reactor. Further, the invention relates to a method for treating fluid masses while generating or consuming thermal energy, in which the fluid masses are passed through a reactor apparatus comprising at least two same-type tubular reactors which are filled with solid particles, at least one tubular reactor containing a temperature measuring unit in which the temperature is measured, said method employing a reactor apparatus comprising at least two same-type tubular reactors which are filled with solid particles, at least one tubular reactor containing a temperature measuring unit, wherein tubular reactors are designed such that both the ratio of the mass of the solid particles to the free cross-sectional area of the respective tubular reactor and the pressure drop measured by an inert gas being conducted proportionately transversely to the free cross-sectional area are identical across the respective tubular reactor. The tubular reactors are designed such that both the ratio of the mass of the solid particles to the free cross-sectional area of the respective tubular reactor and the volume of reactive gas passed through per cross-sectional area are identical across the respective tubular reactor. Preferred embodiments of the invention are described in the following description, the illustrative examples, the figures and the dependent claims.

DETAILED DESCRIPTION OF THE INVENTION

The type of the tubular reactors which can be used is not subject to any particular restriction. In principle, all tubular reactors are suitable such as shell-and-tube reactors, heat exchangers coated with catalyst etc., shell-and-tube reactors being used advantageously. These may vary in terms of the number of tubes employed, the arrangement of the tubes, the length of the tubes employed, the design of the inlet and outlet zone both on the reaction medium side and the heat transfer medium side, the volume of the circulating heat transfer medium and the flow path of the heat transfer medium—eg. cross-flow, concurrent or countercurrent— with respect to the reaction tubes. To control the heat removal or heat supply, shell-and-tube reactors are advantageously used which at the same time are designed as heat exchangers, ie. the reaction volume is located within the tubes, whereas the space between the tubes has a fluid heat transfer medium flowing through it. Hereinafter, the tubular reactors without a temperature measuring unit are referred to also as reaction tubes, whereas the reactor(s) equipped with a temperature measuring unit are referred to also as thermotubes.

In a particularly advantageous embodiment of the invention the tubular reactors are designed such that the ratio of the free cross-sectional area to the circumference of the respective tubular reactor is equal, both in the case of the tubes with and of the tubes without a temperature measuring unit. Thus the conditions established in the two types of tubes come particularly close to being identical.

Particular preference is given likewise to geometric conditions in the tubular reactors with and without the temperature measuring unit which ensure that the ratio of catalyst-filled reactor volume to heat-exchanging peripheral area is identical.

Figure 3:
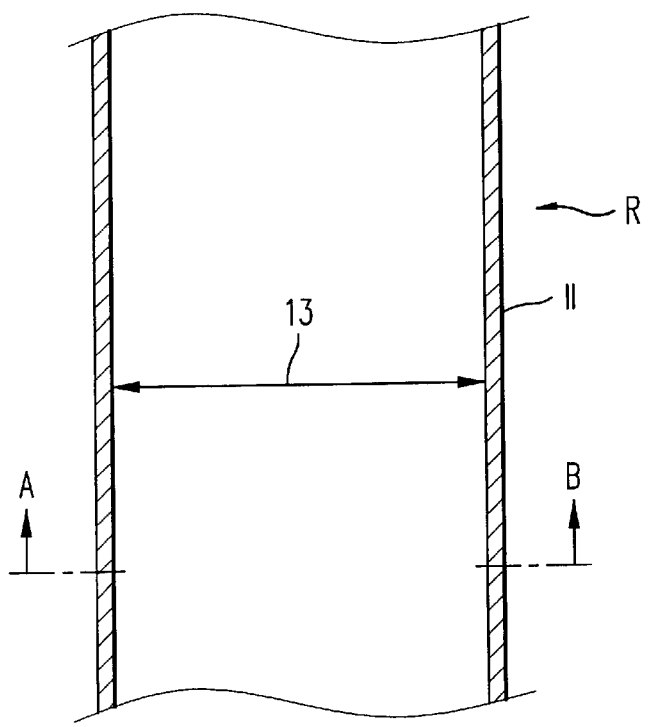
FIG. 3 a portion of a longitudinal section of a tubular reactor without a temperature measuring unit and its protection sleeve.
Figure 4:
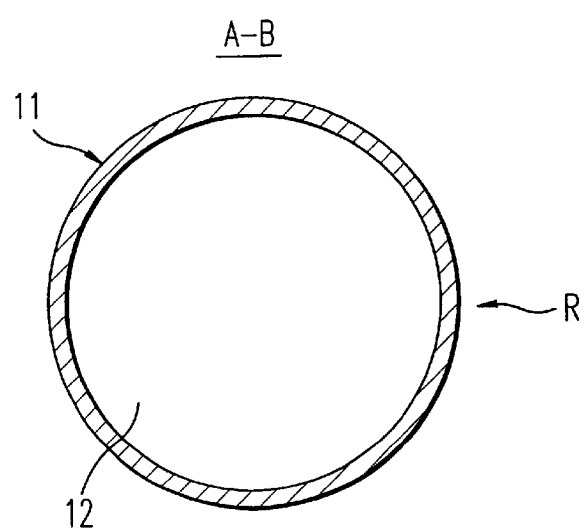
FIG. 4 is a cross section of the tubular reactor of FIG. 3 along line AB.

In FIGS. 3 and 4, the diameter $D_r$ of the enclosed reaction volume of tubular reactor R (reaction tube) is designated by 13. It is the inner diameter of the reaction tube. The free cross-sectional area is $\pi D_r^2/4$. Its wall is designated by 11 and its free cross-sectional area is designated by 12 in FIG. 4.

According to the invention the tubular reactors are charged with solid particles, in particular a catalyst. Where reference is generally made hereinafter to catalyst or catalyst particles, this also generally relates to solid particles. The type of solid particles or of catalyst depends on the reaction being carried out, the type of the reactions per se not being subject to any restrictions. In principle the novel method is suitable for treating fluid masses for all reactions in which temperature changes take place, ie. thermal energy is generated or consumed. In addition the method is also suitable for all types of physicochemical processes in which temperature matters and/or which involve transformations of material. Thus the heating of a fluid stream, for example, in a shell-and-tube heat exchanger can be measured according to the same principle. Particularly suitable are exothermal reactions and among these, in turn, oxidation, dehydrogenation, hydrogenation and oxydehydrogenation reactions, examples to be mentioned being the production of phthalic anhydride from o-xylene, of acrolein from propene, of acrylic acid from propene/acrolein or the production of methacrylic acid from methacrolein. Oxidation reactions often are heterogeneously catalyzed reactions in which the catalyst is present as solid particles. In general such reactions are carried out as gas phase reactions employing, in particular, unsupported catalysts or support materials coated with active material. Within the reaction tubes and thermotubes, solid particles of various geometric shapes and sizes can be used, a size of from 1 mm to 40 mm in terms of characteristic dimension being particularly preferred. Likewise, the bed height of the introduced solid particles can vary, although this will generally be avoided.

Setting the suitable pressure drop and thus the volume flow over the solid particles, in particular the catalyst, is expediently effected by employing solid particles of various sizes and/or various geometries. Advantageously, the solid particles are mixed in the thermotube with catalyst bodies or inert moldings of various geometries which give rise to a different pressure drop than the catalyst moldings in the reaction tubes. Depending on whether the pressure drop in the thermotube is to be increased or decreased in comparison with the pressure drop in the reaction tubes, the catalyst in the thermotube is preferably mixed with catalyst fragments of defined size, which are prepared from the original catalyst molding, or with larger is moldings. Another option is to fit the reaction tubes with disturbing bodies or baffles.

In a preferred embodiment of the invention the pressure drop in the thermotubes, if it is lower than in the reaction tube, is adjusted as follows (so that the mass of catalyst in the thermotubes and reaction tubes is equal):

First of all, a fines fraction is prepared from the catalyst material. This can be done either by a geometrically similar, but smaller catalyst molding being produced by production methods, or by a geometrically similar smaller molding being produced or by the material also used in the reaction tubes being reduced in size and a specific fraction of the material reduced in size being screened out. This catalyst having a larger flow resistance is hereinafter referred to as fines fraction. First the mean pressure drop $P_m$ in the reaction tubes when charged with the catalyst material is determined, and then the pressure drop in the thermotube to be charged when charged with the same (and the same amount of) catalyst material. The latter pressure drop is referred to as $p_1$. Then the catalyst material present in the thermotube is removed by suction, followed by charging with the same mass of fines fraction. The resulting pressure drop is referred to as $P_2$. In accordance with formula (I) below the amount of fines fraction is now determined which is admixed with the catalyst material used in the reaction tubes, so that the sum of the two masses $m_{tot}$ is just the same as the mass of catalyst material which in each case was introduced into the reaction tube. Thus the formula for determining the fines fraction mass is:

$$m_{fines} = m_{tot} \frac{p_m - p_1}{p_2 - p_1} \qquad (I)$$

The catalyst material and the fines fraction are intimately mixed and introduced into the thermotube. The pressure drop then established in the case of gas flow rates proportional to the free cross-sectional area is ±8% within the range of the values of the reaction tubes. This procedure allows the same amount of catalyst to generate the identical pressure drop as in the reaction tubes, even though different cross-sectional areas may be present in the reaction tubes and thermotubes.

A particular advantage of this procedure is also that the pressure drop in the thermotube not only virtually assumes the same final value as in the reaction tubes, but also simultaneously increases monotonously with the bed height, as is also the case with the reaction tubes. Such an advantage is not achieved if disturbing bodies are used in the bed.

If the pressure drop in the thermotube is greater than the pressure drop measured for the reaction tubes, the above-described procedure needs to be modified. In this case catalyst bodies are used for admixture which, as a bulk material, exhibit a lower pressure drop than the catalyst introduced into the reaction tubes.

The tubular reactors charged with solid particles preferably involve turbulent flow of the type important, in particular, under industrially relevant conditions. This corresponds to a linear velocity of the fluid flowing through of from 0.02 to 20 m/s, this linear velocity in particular being from 0.3 to 5 m/s. The pressure drop in the tubular reactors is preferably in the range of from 0.05 to 2 bar, in particular at from 0.1 to 1.5 bar.

Suitable as temperature measuring units are thermocouples or resistance thermometer as customarily used for measuring temperatures in reactors. The type of these temperature measuring units is not subject to any particular restrictions. Two designs have proved particularly suitable in this context. In the first design, the thermocouple or resistant thermometer is fitted axially displaceably and centrally in the tubular reactor in which measurements are to be carried out, and the temperature profile is obtained by axial displacement. In the second design, multiple elements are used whose measuring points are disposed at different axial positions in the tubular reactors, so that they provide information on the temperature profile along the tubular reactor. Only in very exceptional cases will a simple measurement at a fixed point be sufficient. Advantageously, the temperature measuring unit comprises not only a thermocouple or resistance thermometer, but also a thermometer protection sleeve into which it is fitted to protect it mechanically against damage, particularly in industrial use.

The method according to the invention has proved itself in a series of trials carried out. The following trials which represent a preferred embodiment of the invention illustrate the invention. They describe the case where the cross-sectional area of the thermotubes is larger than that of the reaction tubes.

Trial Procedure

The experimental set-up comprises a holder for tubes of various diameters from 20 to 30 mm, which are introduced into a heating bath whose heating medium is fused salt. Propene, nitrogen, steam and air can be introduced in a controlled manner from the upper end of the trial tubes. The tubes used have a length of 2.80 m, of which 2.50 m are heated. The tubes contain BASF catalyst as claimed in DE 23 38 111 C2 in the form of spheres having a diameter of 3 mm, the catalyst having the general composition $Mo_{12}Bi_aMe(1)_bMe(2)_cMe(3)_dMe(4)_eMe(5)_fZn_hO_g$, where:

| | |
|---|---|
| Me(1) | is In and/or La |
| Me(2) | is Fe and/or Cu |
| Me(3) | is Ni and/or Co |
| Me(4) | is at least one element from the group consisting of P, B, As, Cr, V and/or W, |
| Me(5) | is at least one element from the group consisting of Cd, Ta, Nb, Ag, Pb, Mn, Re, Mg, Ca and/or Ba, |
| a | is from 0.1 to 6, preferably from 0.5 to 3 |
| b | is from 0.005 to 3, preferably from 0.01 to 2 |
| c | is from 0.1 to 8, preferably from 0.3 to 6 |
| d | is from 4 to 12 |
| e | is from 0 to 6, preferably from 0.05 to 5 |
| f | is from 0 to 3 |
| g | is from 36 to 102, preferably from 38 to 95 |
| h | is from 0.1 to 10, preferably from 0.5 to 6. |

In the specific case a catalyst was used which corresponded to Example 9 in DE 23 38 111 C2, ie. the composition was: $Mo_{12}Bi_1In_{0.1}Fe_2Ni_{0.6}P_{0.095}Zn_2O_g$, where g is the stoichiometrically required oxygen production as a function of the oxidation state of the catalyst. At its lower end the tube was closed with a metal gauze having square openings of 2×2 mm and a wire diameter of about 0.5 mm. The reaction gas mixture was passed through the reactor in once-through flow.

The following trial parameters were set:
Salt bath temperature: 355° C.
Volume flow propene: 125 l(s.p.p.)/h
Volume flow air: 1,000 l/h
Volume flow nitrogen: 1,000 l/h
Volume flow steam: 500 l/h.

These parameters were maintained in all trials (No. 1 to 9).

The pressure drop across the tubular reactor was determined in trial 1 by 1.5 m³/h of air being passed across the tube filled with catalyst and open at the bottom, and by determining what pressure was required at the inlet side to maintain this gas flow rate, net of the outlet pressure. The corresponding procedure was followed for the further trials 2 to 9, except that said flow rate of the measuring air passed through the tube was varied in proportion to the free cross section of the tubular reactor, so that the mean flow velocity in the tubular reactor remained constant.

In trial 1, 1500 g of catalyst were introduced into a tube having an internal diameter of 23 mm, bulk density 1.57, which resulted in a filling height, from the bottom end of the tube, of 2.31 m. As to be taken from Table 1 below, the trials 2 to 9 were carried out with tubular reactors and thermometer sleeves of various diameters and with an amount of catalyst which was based on the amount from trial 1 and was directly proportional to the free cross-sectional area of the respective set-up. This resulted in filling heights of 2.31±0.12 m. In trials 1 to 5 only the specified spheres having a diameter of 3 mm were introduced, which consequently, given different diameters of the tubes and thermometer sleeves, resulted in different pressure drops in the tubes. In trials 6 to 9 the same pressure drop as in trial 1 was set in the thermotube, the procedure of the above-described method (compare formula (I)) being followed. To this end the trials 2 to 5 were repeated in such a way that the respective catalyst amounts were composed of spherical material plus a further amount, calculated in accordance with formula (I), of fines fraction so that the pressure drop was the same, within the limit of measurement accuracy, as in trial 1. To that end, the pressure drop of 1500 g of pure fines fraction was first determined in the various tubular reactors with the different thermometer sleeves. The same catalyst was used as the fines fraction, first having undergone mechanical size reduction. This size-reduced fraction was first stripped of everything passing through a screen of mesh size 1 mm. Then everything was removed which did not pass through a screen of mesh size 2 mm, so that a fines fraction having a particle size distribution with precisely defined upper and lower limits was obtained.

To evaluate the trials, the respective axial temperature profile established in the reactor was measured, and the propene conversion ratio and the acrolein yield were determined by total condensation of the products formed and analysis by gas chromatography. The axial temperature profile in the catalyst bed was measured after 2 h of continuous operation. To compare trials with one another, the temperatures were measured every 10 cm from the start of the heating zone (distance in the flow direction), and the point of the highest measured temperature ("hot spot") was registered. Particularly informative in these reactions were the temperatures in the first 90 cm. The pressure drop across the tube was measured before and after the trial.

The following table summarizes the experimental conditions obtaining in trials 1 to 9. As this shows, trial 1 serves as the reference system or reference trial and represented the situation in a reaction tube.

TABLE 1

| Trail No. | φ Tubular reactor mm | φ Thermo-meter sleeve mm | Free cross-sectional area (CSA) tubular reactor mm | Free CSA, based on free CSA of trial 1 | Introduced amount of catalyst g | Pressure drop spherical material (1500 g) mbar | Pressure drop fines fraction (1500 g) mbar | Quantity of spherical material g | Calculated quantity of fines fraction g | Circum-ference tubular reactor mm | Free CSA/circum-ference mm |
|---|---|---|---|---|---|---|---|---|---|---|---|
| 1* | 23 | — | 415 | 1.00 | 1500 | 312 | — | 1500 | — | 72.2 | 5.75 |
| 2** | 25 | 5 | 471 | 1.13 | 1695 | 284 | — | 1695 | — | 78.5 | 6.00 |
| 3** | 25 | 8 | 441 | 1.06 | 1590 | 266 | — | 1500 | — | 78.5 | 5.62 |
| 4** | 30 | 5 | 687 | 1.66 | 2490 | 286 | — | 2490 | — | 94.2 | 7.29 |
| 5** | 30 | 8 | 657 | 1.58 | 2370 | 292 | — | 2370 | — | 94.2 | 6.98 |
| 6 | 25 | 5 | 471 | 1.13 | 1695 | 284 | 554 | 1519 | 176 | 78.5 | 6.00 |
| 7 | 25 | 8 | 441 | 1.06 | 1590 | 266 | 514 | 1295 | 295 | 78.5 | 5.62 |
| 8 | 30 | 5 | 687 | 1.66 | 2490 | 286 | 602 | 2285 | 205 | 94.2 | 7.29 |
| 9 | 30 | 8 | 657 | 1.58 | 2370 | 292 | 658 | 2240 | 130 | 94.2 | 6.98 |

*Reference system (reaction tube)
**Comparative trails

Trial 1

In trial 1 a tube having an internal diameter of 23 mm was used, which had a free cross section of 415 mm$^2$. Prior to the start of the trial a thin thermocouple having a diameter of 0.75 mm had been inserted axially in the center of the bed, which was embedded in such a way that, while it could still be pulled out once at the top it could then not be moved back again. This arrangement ensured the least possible disturbance of the catalyst bed.

The trial results are shown in Table 2.

TABLE 2

| Distance in the flow direction | Temperature in ° C. | |
|---|---|---|
| 0 | 356 | |
| 10 | 358 | |
| 20 | 384 | |
| 30 | 406 | |
| 40 | 402 | |
| 50 | 396 | |
| 60 | 391 | |
| 70 | 388 | |
| 80 | 386 | |
| 90 | 387 | |
| 32 | 408 | Hot Spot |
| Propene conversion ratio | 96.6% | |
| Acrolein yield | 88.0% | |
| Pressure drop in mbar | 312 | |

Trial 2

The same procedure was followed as in trial 1, except that a tube having a diameter of 25 mm$^2$ was used and the thermocouple was held in a thermometer sleeve having a diameter of 5 mm. This therefore gave a free cross section of 471 mm$^2$. The trial results are shown in Table 3.

TABLE 3

| Distance in the flow direction | Temperature in ° C. | |
|---|---|---|
| 0 | 356 | |
| 10 | 357 | |
| 20 | 372 | |
| 30 | 384 | |
| 40 | 391 | |
| 50 | 390 | |
| 60 | 386 | |
| 70 | 383 | |
| 80 | 379 | |
| 90 | 377 | |
| 41 | 392 | Hot Spot |

TABLE 3-continued

| Distance in the flow direction | Temperature in ° C. |
|---|---|
| Propene conversion ratio | 94.2% |
| Acrolein yield | 84.0% |
| Pressure drop in mbar | 284 |

Trial 3

The same procedure was followed as in trial 2, except that the diameter of the thermometer sleeve was 8 mm. This therefore gave a free cross section of 441 mm$^2$. The trial results are shown in Table 4.

TABLE 4

| Distance in the flow direction | Temperature in ° C. | |
|---|---|---|
| 0 | 355 | |
| 10 | 356 | |
| 20 | 366 | |
| 30 | 376 | |
| 40 | 380 | |
| 50 | 382 | |
| 60 | 380 | |
| 70 | 379 | |
| 80 | 378 | |
| 90 | 376 | |
| 50 | 382 | Hot Spot |
| Propene conversion ratio | 94.4% | |
| Acrolein yield | 86.5% | |
| Pressure drop in mbar | 266 | |

Trial 4

The same procedure was followed as in trial 2, except that the internal diameter of the reaction tube was 30 mm, so that the free cross-sectional area was 687 mm$^2$. The trial results are shown in Table 5.

TABLE 5

| Distance in the flow direction | Temperature in ° C. |
|---|---|
| 0 | 357 |
| 10 | 362 |
| 20 | 396 |
| 30 | 412 |
| 40 | 408 |
| 50 | 404 |
| 60 | 401 |
| 70 | 395 |

TABLE 5-continued

| Distance in the flow direction | Temperature in ° C. | |
| --- | --- | --- |
| 80 | 391 | |
| 90 | 387 | |
| 28 | 415 | Hot Spot |
| Propene conversion ratio | 98.2% | |
| Acrolein yield | 82.7% | |
| Pressure drop in mbar | 215 | |

Trial 5

The same procedure was followed as in trial 3, except that the internal diameter of the reaction tube was 30 mm, so that the free cross-sectional area was 657 mm$^2$. The trial results are shown in Table 6.

TABLE 6

| Distance in the flow direction | Temperature in ° C. | |
| --- | --- | --- |
| 0 | 355 | |
| 10 | 360 | |
| 20 | 388 | |
| 30 | 409 | |
| 40 | 404 | |
| 50 | 400 | |
| 60 | 397 | |
| 70 | 394 | |
| 80 | 391 | |
| 90 | 388 | |
| 32 | 411 | Hot Spot |
| Propene conversion ratio | 97.5% | |
| Acrolein yield | 85.3% | |
| Pressure drop in mbar | 196 | |

Trial 6

In this trial, trial 2 was repeated, except that fines fraction according to Table 1 was used, so that the catalyst amount resulted from the spherical catalyst and the calculated amount of fines fraction. The trial results are shown in Table 7.

TABLE 7

| Distance in the flow direction | Temperature in ° C. | |
| --- | --- | --- |
| 0 | 357 | |
| 10 | 359 | |
| 20 | 383 | |
| 30 | 407 | |
| 40 | 403 | |
| 50 | 393 | |
| 60 | 390 | |
| 70 | 386 | |
| 80 | 382 | |
| 90 | 382 | |
| 35 | 408 | Hot Spot |
| Propene conversion ratio | 96.5% | |
| Acrolein yield | 88.2% | |
| Pressure drop in mbar | 306 | |

Trial 7

The same procedure was followed as in trial 3 (ie. same geometry of tube and thermometer sleeve), except that the pressure drop was set by means of 295 g of fines fraction (according to Table 1). The trial results are shown in Table 8.

TABLE 8

| Distance in the flow direction | Temperature in ° C. | |
| --- | --- | --- |
| 0 | 356 | |
| 10 | 359 | |
| 20 | 386 | |
| 30 | 404 | |
| 40 | 403 | |
| 50 | 392 | |
| 60 | 391 | |
| 70 | 386 | |
| 80 | 385 | |
| 90 | 384 | |
| 38 | 404 | Hot Spot |
| Propene conversion ratio | 96.4% | |
| Acrolein yield | 88.0% | |
| Pressure drop in mbar | 314 | |

Trial 8

The same procedure was followed as in trial 4 except that the pressure drop was set by means of 205 g of fines fraction (see Table 1). The trial results are shown in Table 9.

TABLE 9

| Distance in the flow direction | Temperature in ° C. | |
| --- | --- | --- |
| 0 | 354 | |
| 10 | 357 | |
| 20 | 386 | |
| 30 | 404 | |
| 40 | 408 | |
| 50 | 400 | |
| 60 | 394 | |
| 70 | 392 | |
| 80 | 390 | |
| 90 | 389 | |
| 40 | 408 | Hot Spot |
| Propene conversion ratio | 95.8% | |
| Acrolein yield | 87.8% | |
| Pressure drop in mbar | 313 | |

Trial 9

In this trial, 130 g of fines fraction (see Table 1) were used to set the ed pressure drop, this trial otherwise being identical with trial 5. The results are shown in Table 10.

TABLE 10

| Distance in the flow direction | Temperature in ° C. | |
| --- | --- | --- |
| 0 | 355 | |
| 10 | 356 | |
| 20 | 384 | |
| 30 | 405 | |
| 40 | 406 | |
| 50 | 403 | |
| 60 | 396 | |
| 70 | 392 | |
| 80 | 390 | |
| 90 | 387 | |
| 41 | 407 | Hot Spot |
| Propene conversion ratio | 96.6% | |
| Acrolein yield | 88.1% | |
| Pressure drop in mbar | 308 | |

Figure 1:
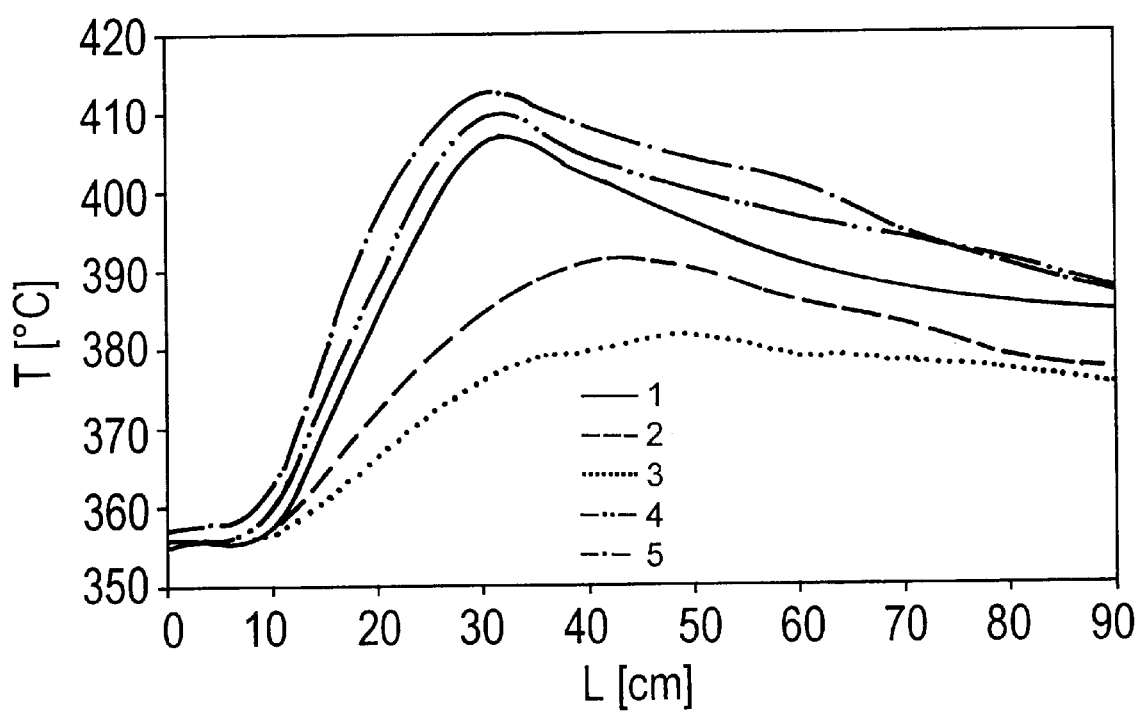
FIG. 1 the temperature in dependence on length from the start of the heating zone of the tube for trials 1 to 5 described in the examples.
Figure 2:
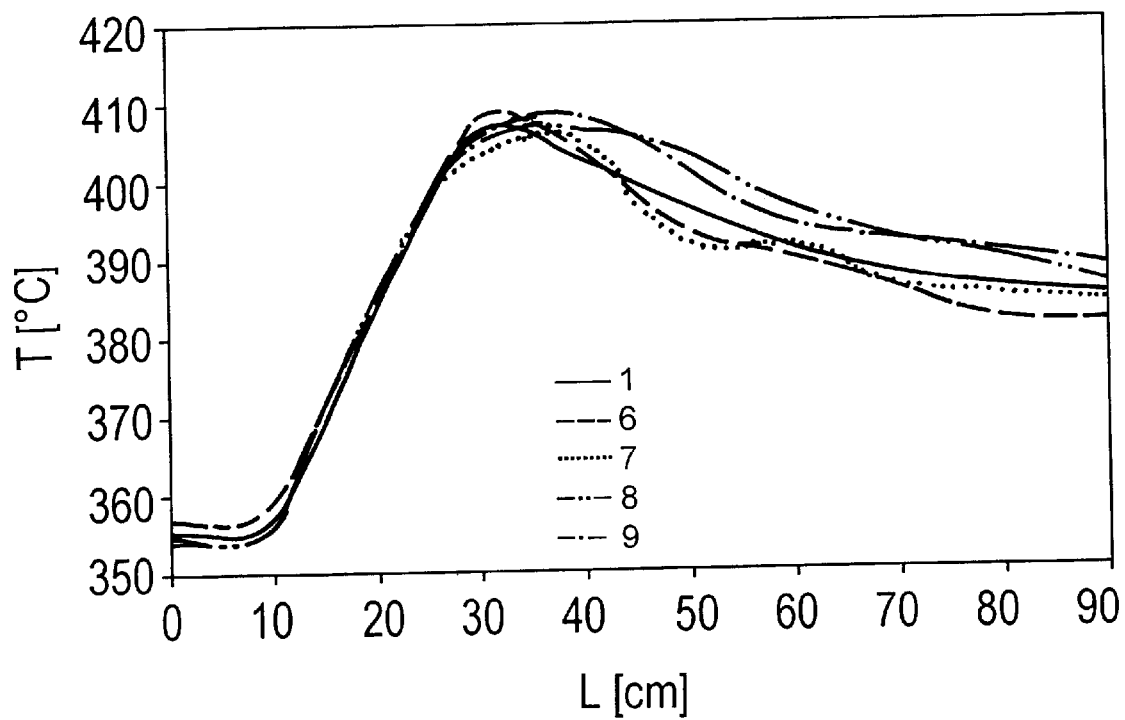
FIG. 2 the temperature in dependence on length from the start of the heating zone of the tube for trials 1 and 6 to 9 described in the examples.

The trial results shown in Tables 2 to 10 are also depicted in FIGS. 1 and 2 as a function of temperature T (in °C.; ordinate) in dependence on length L from the start of the heating zone of the tube (in cm; abszisse), wherein FIG. 1 shows trials 1 to 5 and FIG. 2 shows trials 1 and 6 to 9 (the digits and different lines given at the right hand margin of the figures relate to the trials corresponding to the digits). It can thus be seen that employing the method according to the invention (trial 6 to 9) provides a better representation of the temperature profile in the reaction tube according to trial 1 than the comparative trials 2 to 5, in which the pressure drop differed from that in trial 1. FIGS. 1 and 2 also show that the best results are achieved if the ratio of free cross-sectional area to circumference of the respective tubular reactor is substantially identical, as is the case in trials 6 and 7. These latter trials are particularly similar, in thermal terms, to reference trial 1. The novel method thus successfully enables representative temperature measurements in tubular reactors charged with catalyst.

What is claimed is:

1. A reactor apparatus comprising at least two tubular reactors each of the tubular reactors defining a reaction volume enclosed within a tube through which fluid may flow, the tubular reactors being filled with solid particles, at least one tubular reactor, termed a thermotube, containing a temperature measuring unit in a protection sleeve placed centrally and in an axial position, which occupies a portion of, and thereby reduces the free cross-sectional area and reaction volume of the tubular reactor measured in the absence of the protection sleeve and the temperature measuring unit therein, thereby defining a reduced reaction volume in the tubular reactor, and at lease one tubular reactor, termed a reaction tube, not containing said temperature measuring unit and protection sleeve, wherein the tubular reactors filled with such solid particles are designed such that (a) the ratio of the mass of the solid particles to the free cross-sectional area of one tubular reactor is substantially identical to said ratio of every other tubular reactor of said reactor apparatus, and (b) the pressure drop of one tubular reactor measured by a gas being conducted proportionately transversely to the free cross-sectional area to maintain constant mean flow velocity, is substantially identical to said pressure drop of every other tubular reactor of said reactor apparatus, the free cross-sectional area of the reaction tube being the cross-sectional area of its defined reaction volume and the free cross-sectional area of the thermotube being the cross-sectional area of the defined reduced reaction volume measured at the location of the temperature measuring unit and its protection sleeve.

2. An apparatus as claimed in claim 1, wherein the tubular reactors are further designed such that the ratio of free cross-sectional area to the circumference is substantially the same for all the tubular reactors.

3. An apparatus as claimed in claim 1, wherein the pressure drops are adjusted between tubular reactors of different free cross-sectional area by solid particles having different sizes and/or different geometries so that the pressure drops are substantially the same for all such tubular reactors.

4. An apparatus as claimed in claim 1, wherein the pressure drop in each thermotube is adjusted by a prepared fines fraction of the solid particles in accordance with the following formula:

$$m_{fines} = m_{tot} \frac{p_m - p_1}{p_2 - p_1} \quad (I)$$

where $m_{fines}$ represents the mass of the prepared fines fraction of the solid particles, $m_{tot}$ represents the total mass of the solid particles including the prepared fines function, $p_m$ represents the mean pressure drop in the tubular reactors without a temperature measuring unit, $p_1$ represents the pressure drop in the tubular reactor including a temperature measuring unit when filled with the solid particles absent the prepared fines fraction, and $p_2$ represents the pressure drop in the tubular reactor including a temperature measuring unit when filled with the prepared fines fraction alone.

5. An apparatus as claimed in claim 1, wherein the temperature measuring unit is arranged axially displaceably and centrally in the tubular reactor.

6. An apparatus as claimed in claim 1, wherein the temperature measuring unit comprises multiple elements whose measuring points are disposed at different axial positions of the tubular reactor.

7. The reactor apparatus of claim 4 where the solid particles, other than the prepared fines fraction, are all of equal size with a characteristic dimension of from 1 mm to 40 mm and the prepared fines fraction is the product of a mechanical size reduction of the solid particles having the characteristic dimension of from 1 mm to 40 mm.

8. The reactor apparatus of claim 7, wherein the ratio of the diameter of the protection sleeve in the thermotube to that of the free cross-sectional area of the tubular reactor in the absence of the protection sleeve is at least as great as 5 to 30.

9. The reactor apparatus of claim 1 wherein the free cross-sectional area of the reaction tube having an inner diameter $D_r$ is $\pi D_r^2/4$, and the free cross-sectional area of the thermotube having the tubular reactor of inner diameter $D_t$ and the protection sleeve of outer diameter $D_s$ is $\pi D_t^2/4 - \pi D_s^2/4$.

10. A reactor apparatus comprising at least two tubular reactors, each of the tubular reactors defining a reaction volume enclosed within a tube through which fluid may flow, the tubular reactors being filled with solid particles, at least one tubular reactor, termed a thermotube, containing a temperature measuring unit in a protection sleeve placed centrally and in an axial position, which occupies a portion of, and thereby reduces, the free cross-sectional area and reaction volume of the tubular reactor measured in the absence of the protection sleeve and the temperature measuring unit therein, thereby defining a reduced reaction volume in the tubular reactor, and at least one tubular reactor, termed a reaction tube, not containing said temperature measuring unit and protection sleeve, wherein the tubular reactors filled with such solid particles are designed such that (a) the ratio of the mass of the solid particles to the free cross-sectional area of one tubular reactor is substantially identical to said ratio of every other tubular reactor of said reactor apparatus, and (b) the pressure drop of one tubular reactor, measured by a gas being conducted proportionately transversely to the free cross-sectional area to maintain constant mean flow velocity, is substantially identical to said pressure drop of every other tubular reactor of said reactor apparatus, the free cross-sectional area of the reaction tube being the cross-sectional area of its defined reaction volume and the free cross-sectional area of the thermotube being the cross-sectional area of the defined reduced reaction volume measured at the location of the temperature measuring unit and its protection sleeve, wherein the tubular reactors are further designed such that the ratio of free cross-sectional area to the circumference is substantially the same for all the said tubular reactors, and wherein the pressure drop of each tubular reactor is adjusted by solid particles having different sizes and/or different geometries.

11. A reactor apparatus as claimed in claim 10, wherein the pressure drop in each thermotube is adjusted by a prepared fines fraction of the solid particles in accordance with the following formula:

$$m_{fines} = m_{tot} \frac{p_m - p_1}{p_2 - p_1} \qquad (I)$$

wherein $m_{fines}$ represents the mass of the prepared fines fraction of the solid particles, $m_{tot}$ represents the total mass of the solid particles including the prepared fines fraction, $p_m$ represents the mean pressure drop in the tubular reactors without a temperature measuring unit, $p_1$ represents the pressure drop in the tubular reactor including a temperature measuring unit when filled with the solid particles absent the prepared fines fraction, and $p_2$ represents the pressure drop in the tubular reactor including the temperature measuring unit when filled with the prepared fines fraction alone.

12. A reactor apparatus as claimed in claim 10, wherein the temperature measuring unit is arranged axially displaceably and centrally in the tubular reactor.

13. A reactor apparatus as claimed in claim 10, wherein the temperature measuring unit comprises multiple elements whose measuring points are disposed at different axial positions of the tubular reactor.

* * * * *

UNITED STATES PATENT AND TRADEMARK OFFICE
CERTIFICATE OF CORRECTION

PATENT NO. : 6,333,011 B1
DATED : December 25, 2001
INVENTOR(S) : Volker Schliephake et al.

Figure 5:
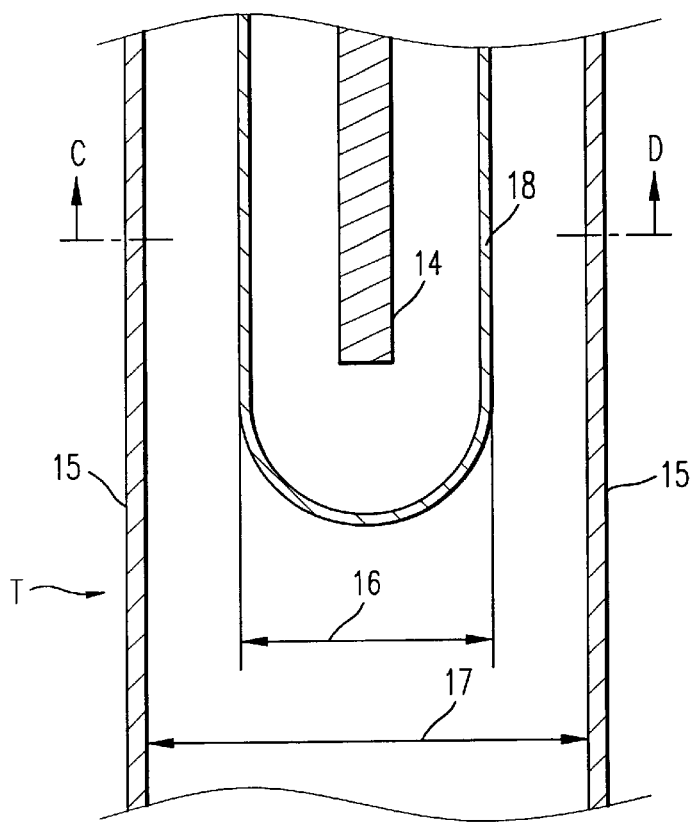
FIGS. 5 and 6 are corresponding sections of a tubular reactor with a temperature measurement unit and protection sleeve.
Figure 6:
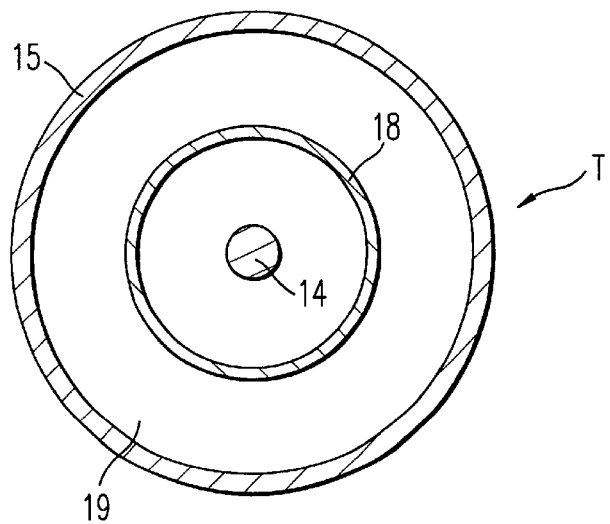

It is certified that error appears in the above-identified patent and that said Letters Patent is hereby corrected as shown below:

Column 3,
Line 27, insert the following paragraph:
-- In figs. 5 and 6, the inner diameter $D_t$ of the tubular reactor T (a thermotube) is designated by 17. Its wall is designated by 15. The outer diameter $D_s$ of the thermometer protection sleeve 18, within which there is the temperature measuring unit 14 is designated by 16. The free cross-sectional area 19 at the location CD is $\pi D_t^2/4 - \pi D_x^2/4$. --
Line 46, "anhyride" should read -- anhydride --.

Column 4,
Line 4, "larger is moldings" should read -- larger moldings --;
Line 18, "$P_m$" should read -- $p_m$ --;
Line 26, "$P_2$" should read -- $p_2$ --.

Column 5,
Line 53, "$Mo_{12}Bi_1In_{0.1}Fe_2Ni_{0.6}P_{0.095}Zn_2O_g$," should read
-- $Mo_{12}Bi_1In_{0.1}Fe_2Ni_{6.0}P_{0.095}Zn_2O_g$," --.

Columns 7 and 8,
Table 1, 4$^{th}$ column header, "Free cross-sectional area (CSA) tubular reactor mm" should read -- Free cross-sectional area (CSA) tubular reactor mm$^2$ --.

Table 1, 2$^{nd}$ footnote "**Comparative trails" should read
-- **Comparative trials --.

Signed and Sealed this

Fourteenth Day of January, 2003

JAMES E. ROGAN
*Director of the United States Patent and Trademark Office*